US012202587B2

(12) United States Patent
Saruwatari et al.

(10) Patent No.: US 12,202,587 B2
(45) Date of Patent: Jan. 21, 2025

(54) MARINE PROPULSION DEVICE AND METHOD OF CONTROLLING MARINE PROPULSION DEVICE

(71) Applicant: YAMAHA HATSUDOKI KABUSHIKI KAISHA, Iwata (JP)

(72) Inventors: Kimitaka Saruwatari, Shizuoka (JP); Hiroshi Suzuki, Shizuoka (JP); Masaya Oishi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 27 days.

(21) Appl. No.: 18/220,898

(22) Filed: Jul. 12, 2023

(65) Prior Publication Data

US 2024/0116615 A1 Apr. 11, 2024

(30) Foreign Application Priority Data

Oct. 5, 2022 (JP) ................................ 2022-161147

(51) Int. Cl.
*B63H 21/21* (2006.01)
*F02D 41/06* (2006.01)

(52) U.S. Cl.
CPC .......... *B63H 21/21* (2013.01); *F02D 41/064* (2013.01); *F02D 41/065* (2013.01); *B63H 2021/216* (2013.01)

(58) Field of Classification Search
CPC . B63H 21/21; B63H 2021/216; F02D 41/064; F02D 41/065; F02D 41/042
See application file for complete search history.

(56) References Cited

U.S. PATENT DOCUMENTS

2018/0178892 A1* 6/2018 Suzuki .................... F01P 3/202

FOREIGN PATENT DOCUMENTS

JP 2018-105279 A 7/2018

* cited by examiner

*Primary Examiner* — Sizo B Vilakazi
(74) *Attorney, Agent, or Firm* — Keating & Bennett, LLP

(57) ABSTRACT

A marine propulsion device that reduces white smoke generated during starting includes an engine, a crankshaft, a tilt angle sensor, and an ECU. The engine includes a cylinder, a piston inside the cylinder, and a connecting rod connected to the piston. The crankshaft is connected to the connecting rod. The tilt angle sensor is operable to detect a tilt state of the cylinder such that a first side portion thereof located on an opposite side from the crankshaft is lower than a second side portion thereof located on a same side as the crankshaft. The ECU is configured or programmed to execute a cranking control of a prolonged cranking time based on the tilt state of the cylinder and a stopped time of the engine.

6 Claims, 9 Drawing Sheets

MARINE PROPULSION DEVICE AND METHOD OF CONTROLLING MARINE PROPULSION DEVICE

CROSS REFERENCE TO RELATED APPLICATIONS

This application claims the benefit of priority to Japanese Patent Application No. 2022-161147 filed on Oct. 5, 2022. The entire contents of this application are hereby incorporated herein by reference.

BACKGROUND OF THE INVENTION

1. Field of the Invention

The present invention relates to a marine propulsion device and a method of controlling a marine propulsion device.

2. Description of the Related Art

There is a type of marine propulsion device in which mechanical power, generated by an engine, is transmitted to a propeller through a crankshaft such that the propeller is rotated. The engine in the marine propulsion device includes a combustion chamber, a piston disposed inside the combustion chamber, and a rod connecting the piston and the crankshaft. A lot of marine propulsion devices employ a component layout in which the crankshaft is installed in a vertical orientation so as to set the combustion chamber in a horizontal orientation.

On the other hand, there is a type of marine propulsion device provided with a tilt mechanism for enhancing navigational performance and/or for prevention of corrosion to be caused when the marine propulsion device is stored during mooring of a watercraft. Chances are that when stored, the marine propulsion device is changed in posture for a long period of time (see Japan Laid-open Patent Application Publication No. 2018-105279).

When the marine propulsion device is changed in posture by using the tilt mechanism as described above, the engine is changed in posture in accordance therewith. When the engine is changed in posture during storage of the marine propulsion device, the combustion chamber is tilted such that a first side portion thereof, located on the opposite side from the crankshaft, is lower than a second side portion thereof located on the same side as the crankshaft, such that an oil is likely to flow across a piston ring and be accumulated in the combustion chamber. When the engine is started in such a condition that the oil is accumulated in the combustion chamber, a large amount of white smoke is generated.

SUMMARY OF THE INVENTION

Preferred embodiments of the present invention provide marine propulsion devices and methods of controlling marine propulsion devices, each of which reduce or prevent white smoke from being generated during starting of an engine.

A marine propulsion device according to a first preferred embodiment of the present invention includes an engine, a crankshaft, a tilt detector, and a controller. The engine includes a cylinder, a piston inside the cylinder, and a rod connected to the piston. The crankshaft is connected to the rod. The tilt detector is operable to detect a tilt state of the cylinder such that a first side portion thereof located on an opposite side from the crankshaft is lower than a second side portion thereof located on a same side as the crankshaft. The controller is configured or programmed to execute a first cranking control of a prolonged cranking time based on the tilt state of the cylinder and a stopped time of the engine.

A method of controlling a marine propulsion device according to a second preferred embodiment of the present invention includes detecting a tilt state of a cylinder such that a first side portion thereof located on an opposite side from a crankshaft is lower than a second side portion thereof located on a same side as the crankshaft, the cylinder accommodating a piston therein and the piston is connected to the crankshaft through a rod, and executing a cranking control of a prolonged cranking time based on the tilt state of the cylinder and a stopped time of an engine.

According to preferred embodiments of the present invention, it is determined whether or not oil is accumulated in the cylinder based on the tilt state of the cylinder and the stopped time of the engine. When it is determined that oil is accumulated in the cylinder, a control is performed to prolong the cranking time. Accordingly, the oil is discharged from the interior of the cylinder. Because of this, white smoke generated during starting of the engine is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be hereinafter explained with reference to drawings.

Figure 1:
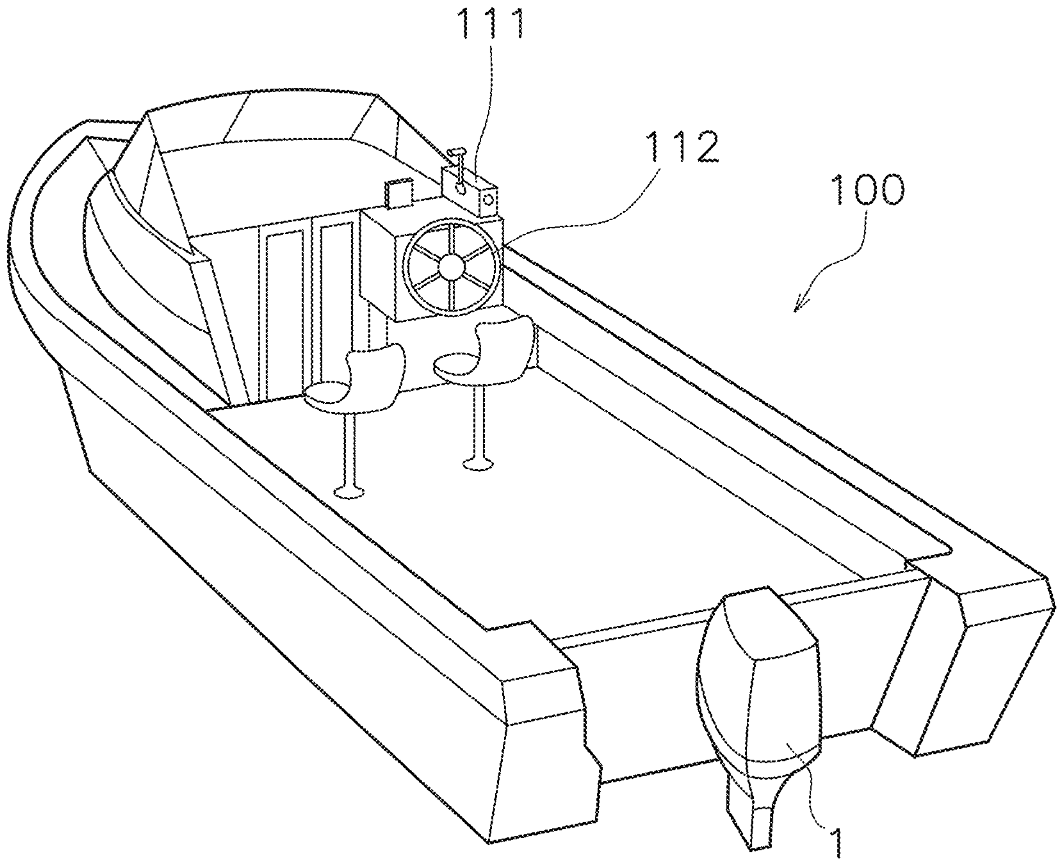
FIG. 1 is a diagram showing a watercraft to which a marine propulsion device according to a preferred embodiment of the present invention is attached.

FIG. 1 is a perspective view of a watercraft 100 to which a marine propulsion device 1 according to a preferred embodiment of the present invention is attached. The marine propulsion device 1 is attached to the stern of the watercraft 100. The marine propulsion device 1 generates a thrust to propel the watercraft 100. In the present preferred embodiment, the marine propulsion device 1 is an outboard motor.

Figure 2:
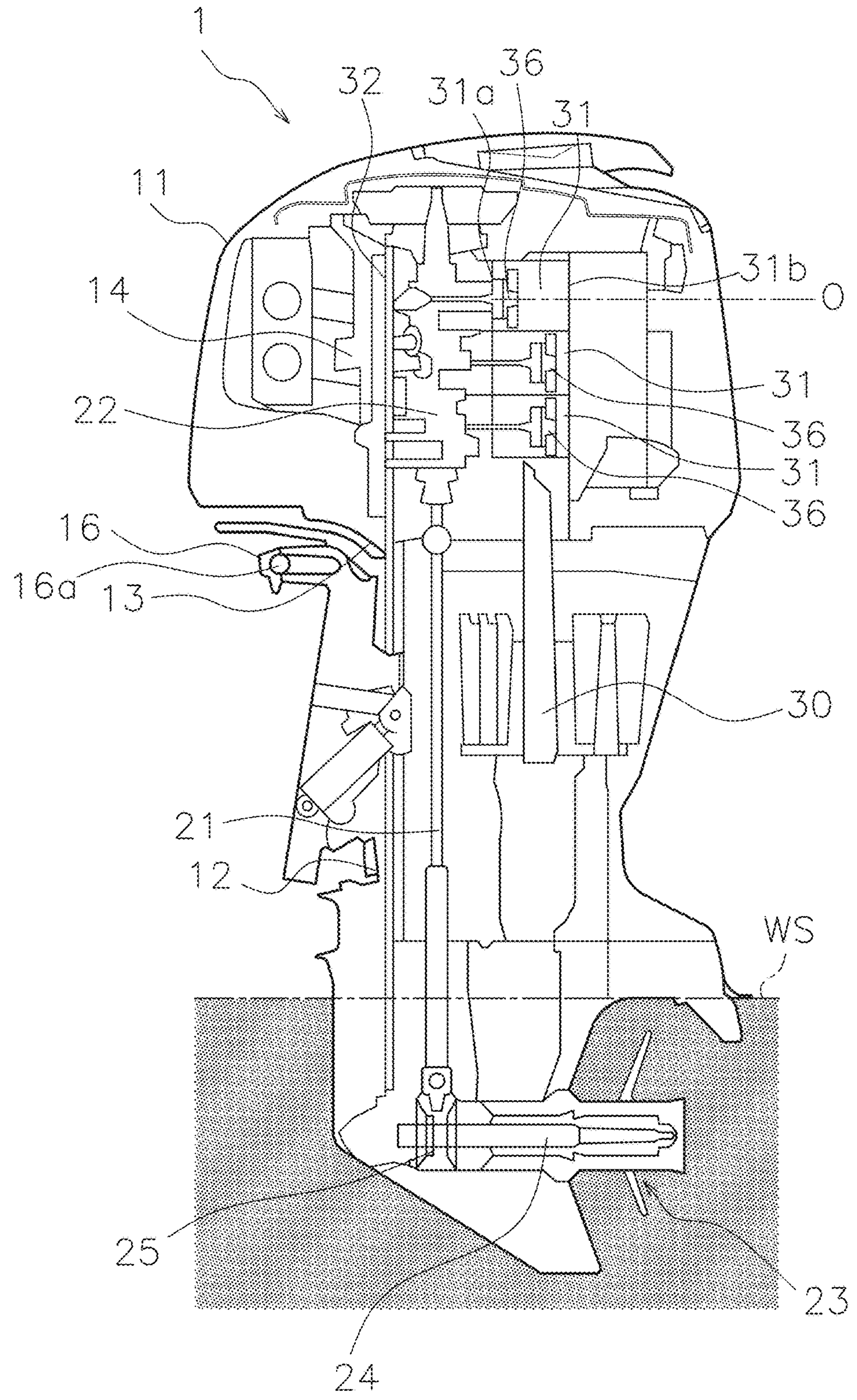
FIG. 2 is a side view of a configuration of the marine propulsion device.

FIG. 2 is a side view of the marine propulsion device 1. The marine propulsion device 1 is attached to the stern of the watercraft 100 through a bracket 16. In FIG. 2, the surface of water is identified by reference sign WS.

The marine propulsion device 1 includes an upper casing 11, a lower casing 12, an exhaust guide 13, and an engine 14. The upper casing 11, the lower casing 12, and the engine 14 are fixed to the exhaust guide 13.

The engine 14 is disposed inside the upper casing 11. The engine 14 includes a crankshaft 22. A drive shaft 21 is disposed inside the lower casing 12. The drive shaft 21 extends along an up-and-down direction inside the lower casing 12. The drive shaft 21 is coupled to the crankshaft 22 of the engine 14. A propeller 23 is disposed at a lower portion of the lower casing 12. The propeller 23 is disposed directly below the engine 14. A propeller shaft 24 is coupled to the propeller 23. The propeller shaft 24 extends along a back-and-forth direction. The propeller shaft 24 is coupled to a lower portion of the drive shaft 21 through a shift mechanism 25. The shift mechanism 25 switches the rotational direction of mechanical power to be transmitted from the drive shaft 21 to the propeller shaft 24. The shift mechanism 25 includes, for instance, a plurality of gears and a clutch that changes meshing of the gears.

In the marine propulsion device 1, a drive force generated by the engine 14 is transmitted to the propeller 23 through the drive shaft 21 and the propeller shaft 24. Accordingly, the propeller 23 is rotated in either a direction corresponding to forward movement or a direction corresponding to rearward movement. As a result, the thrust is generated to move forward or rearward the watercraft 100 to which the marine propulsion device 1 is attached.

As shown in FIG. 2, the marine propulsion device 1 is provided with an exhaust pathway 30 in the interior thereof. The exhaust pathway 30 extends downward from the engine 14. The exhaust pathway 30 is connected to an exhaust port of the engine 14 and communicates with the internal space of a propeller boss (not shown in the drawings) of the propeller 23. Exhaust gas from the engine 14 passes through the exhaust pathway 30 and is then discharged through the internal space of the propeller boss into the water.

Figure 3:
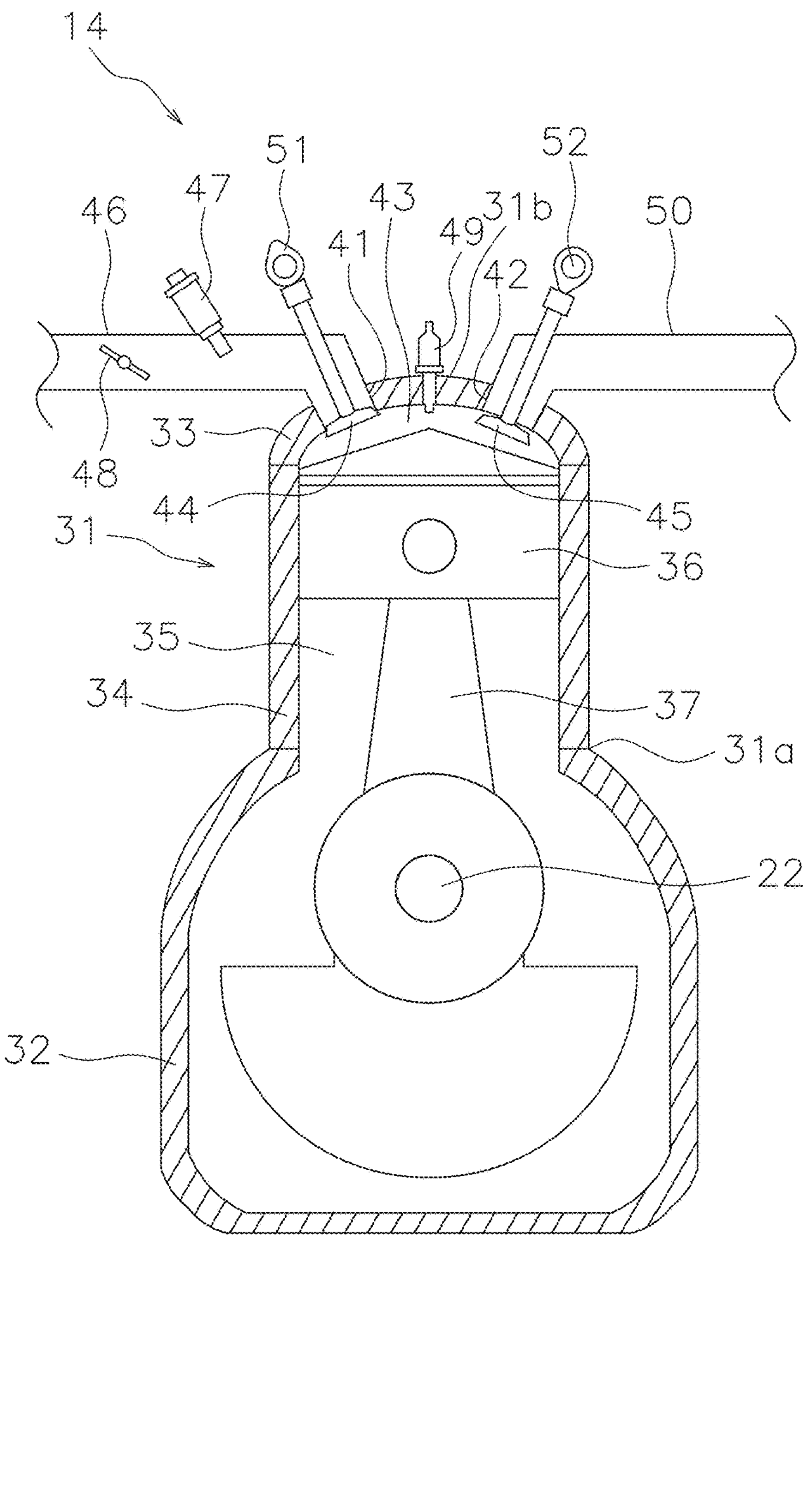
FIG. 3 is a schematic top view of an internal configuration of an engine.

FIG. 3 is a schematic top view of an internal configuration of the engine 14. In the present preferred embodiment, the engine 14 includes a crankcase 32 and a plurality of cylinders 31. The number of cylinders 31 is not particularly limited to a specific value. The configuration of one cylinder 31 among the plurality of cylinders 31 of the engine 14 will be hereinafter explained based on FIG. 3. However, all of the plurality of cylinders 31 of the engine 14 are comparable in configuration to the cylinder 31 shown in FIG. 3.

In such a condition as shown in FIG. 1, the cylinder 31 extends in a horizontal direction. As shown in FIG. 2, the cylinder 31 is disposed such that a center axis O thereof is horizontal. As shown in FIG. 3, the cylinder 31 includes a cylinder head 33 and a cylinder block 34. The cylinder head 33 is attached to the cylinder block 34. The cylinder block 34 is provided with a cylinder chamber 35 in the interior thereof. A piston 36 is disposed inside the cylinder chamber 35 while being movable in the axial direction of the cylinder chamber 35. A connecting rod 37 (exemplary rod) is coupled at one end thereof to the piston 36. The connecting rod 37 is coupled at the other end thereof to the crankshaft 22.

The cylinder head 33 includes an intake port 41, an exhaust port 42, and a combustion chamber 43. Each of the intake port 41 and the exhaust port 42 communicates with the combustion chamber 43. The intake port 41 is opened and closed by an intake valve 44. The exhaust port 42 is opened and closed by an exhaust valve 45. An intake pipe 46 is connected to the intake port 41. A fuel injection device 47 is attached to the intake pipe 46. The fuel injection device 47 injects a fuel to be supplied to the combustion chamber 43. A throttle valve 48 is disposed in the intake pipe 46. The amount of a gas mixture to be fed to the combustion chamber 43 is regulated by changing the opening degree of the throttle valve 48. An exhaust pipe 50 is connected to the exhaust port 42. An ignition device 49 (exemplary ignition) is attached to the cylinder head 33. The ignition device 49 is inserted into the combustion chamber 43 and ignites the fuel.

The intake valve 44 is biased in a direction corresponding to closing the intake port 41 by an urging member such as a coil spring or so forth (not shown in the drawings). The intake valve 44 is opened and closed when an intake camshaft 51 is driven to be rotated. The exhaust valve 45 is biased in a direction corresponding to closing the exhaust port 42 by an urging member such as a coil spring or so forth (not shown in the drawings). The exhaust valve 45 is opened and closed when an exhaust camshaft 52 is driven to be rotated.

Figure 4:
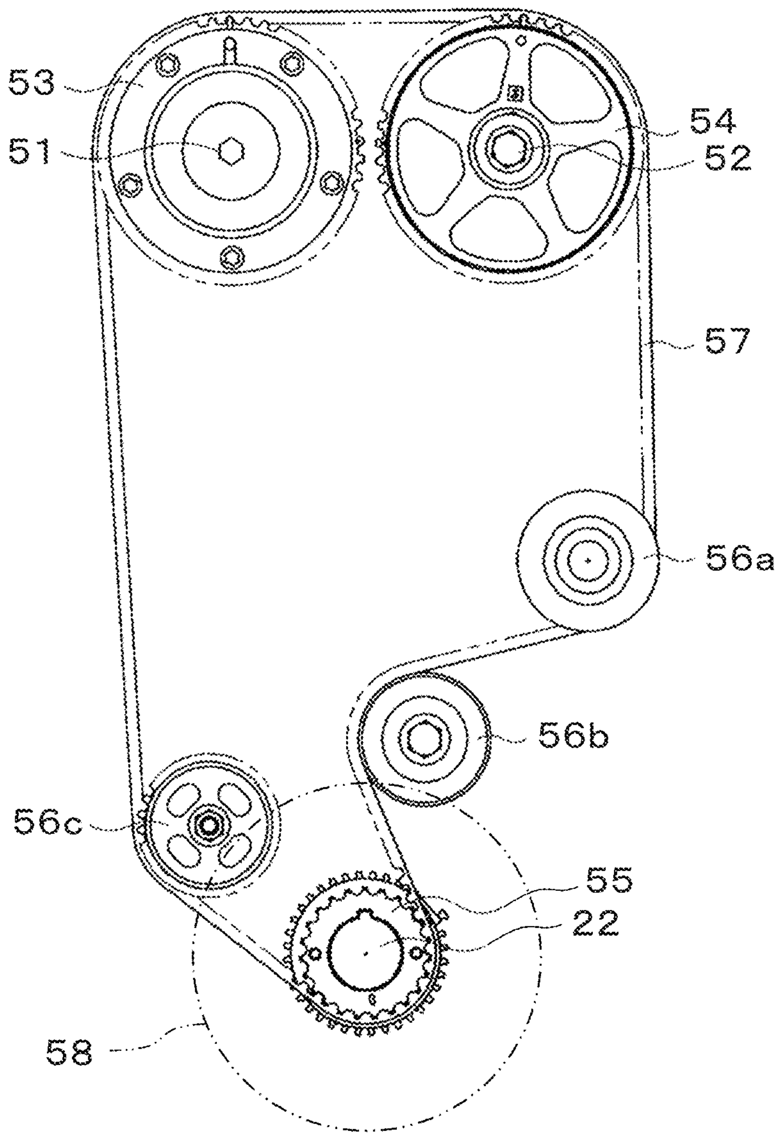
FIG. 4 is a top view of a drive mechanism to rotate an intake camshaft and an exhaust camshaft.

FIG. 4 is a top view of a drive mechanism to drive the intake camshaft 51 and the exhaust camshaft 52 to be rotated. The drive mechanism is disposed on, for instance, the top surface of the engine 14. As shown in FIG. 4, an intake cam pulley 53 is fixed to an end of the intake camshaft 51. An exhaust cam pulley 54 is fixed to an end of the exhaust camshaft 52. A crank pulley 55 is fixed to the crankshaft 22. A cam belt 57 is wrapped and stretched over the intake cam pulley 53, the exhaust cam pulley 54, the crank pulley 55, and a plurality of intermediate pulleys **56*a*, 56*b*, and 56*c*. The drive force of the crankshaft 22 is transmitted to the intake camshaft 51 and the exhaust camshaft 52 through the cam belt 57. It should be noted that a flywheel 58 is fixed to an end of the crankshaft 22**.

When the crankshaft 22 is rotated, the intake cam pulley 53 and the exhaust cam pulley 54 are rotated through the cam belt 57. Accordingly, the intake camshaft 51 fixed to the intake cam pulley 53 is rotated as well such that the intake valve 44 is opened and closed. Likewise, the exhaust camshaft 52 fixed to the exhaust cam pulley 54 is rotated as well such that the exhaust valve 45 is opened and closed. For example, each of the intake valve 44 and the exhaust valve 45 is opened and closed once, while the crankshaft 22 is rotated twice.

Figure 5:
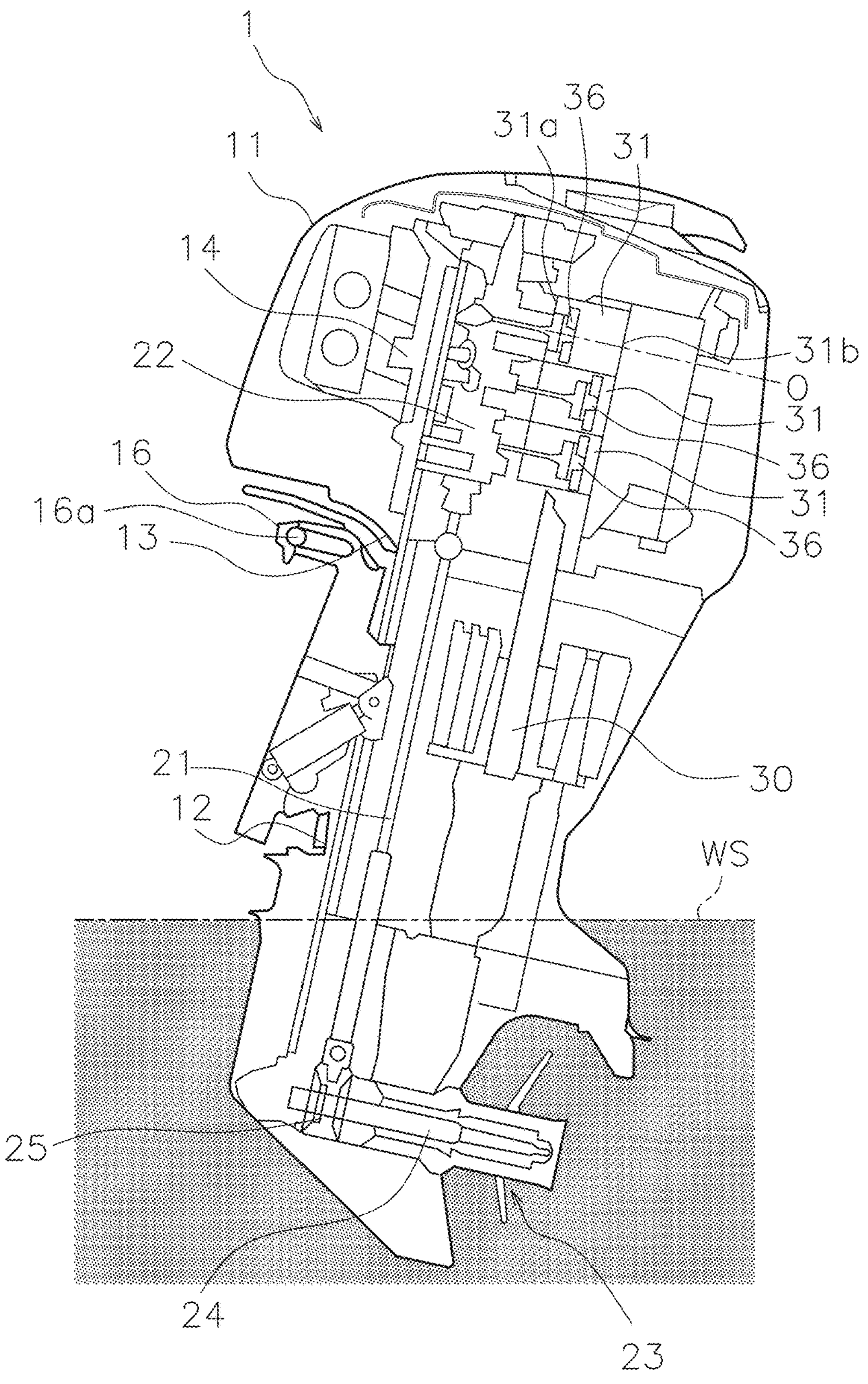
FIG. 5 is a side view of a state of the marine propulsion device changed in posture by a tilt mechanism.
Figure 6:
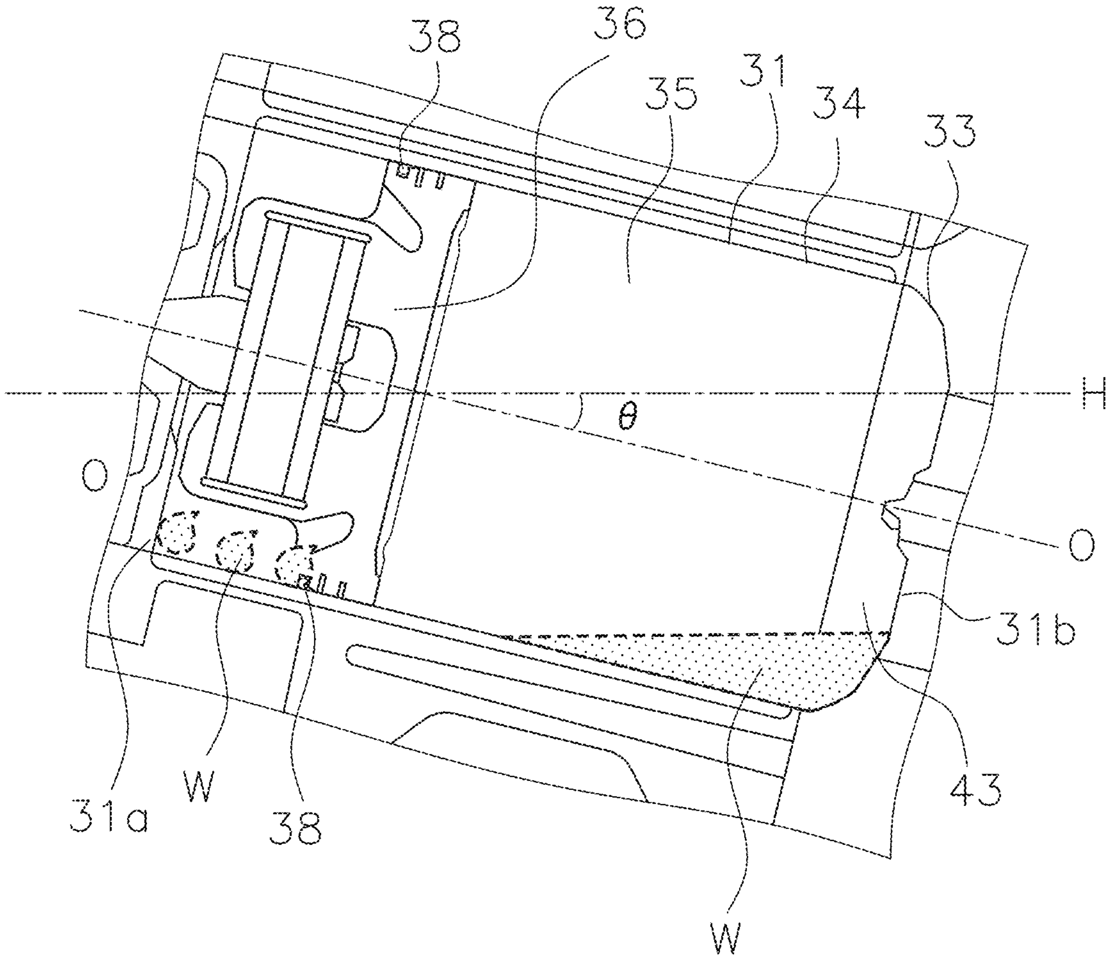
FIG. 6 is a closeup view of a cylinder and the vicinity thereof shown in FIG. 5.

FIG. 5 is a side view of a state of the marine propulsion device 1 according to the present preferred embodiment changed in posture by a tilt mechanism. FIG. 6 is a closeup view of the cylinder 31 and the vicinity thereof shown in FIG. 5. The marine propulsion device 1 is able to tilt about a rotational shaft **16*a* of the bracket 16**.

As shown in FIGS. 5 and 6, one end of the cylinder 31, disposed on the same side as the crankshaft 22, is identified by reference sign **31*a*, whereas the other end thereof, disposed on the opposite side from the crankshaft 22, is identified by reference sign 31*b*. In a tilt state shown in FIGS. 5 and 6, the cylinder 31 is tilted such that the end 31*b* is lower than the end 31*a*. When the marine propulsion device 1 is stored in such a tilted state, chances are that, as shown in FIG. 6, oil W is moved toward the end 31*b* across a piston ring 38 disposed in the surroundings of the piston 36 and is accumulated in the combustion chamber 43. When the engine 14 is started in such a condition that the oil W is accumulated in the combustion chamber 43**, a large amount of white smoke is generated. To cope with this, preferred embodiments of the present invention reduce the amount of white smoke generated during starting of the engine.

Figure 7:
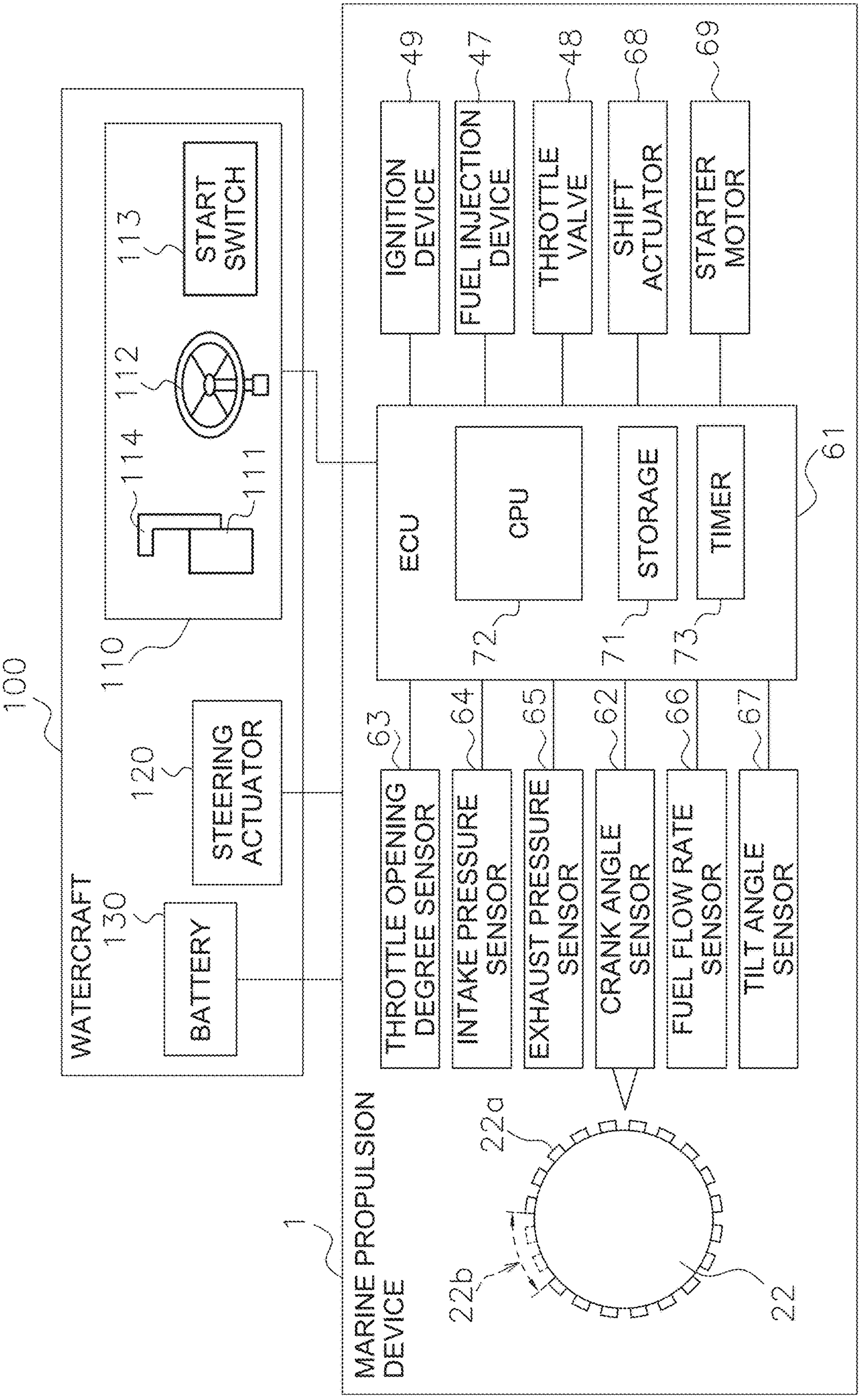
FIG. 7 is a diagram showing a configuration of a control system of the engine.

FIG. 7 is a diagram showing a configuration of a control system of the engine 14. The marine propulsion device 1 includes an ECU (Engine Control Unit) 61 (exemplary controller). The engine 14 is controlled by the ECU 61. The ECU 61 receives signals inputted thereto from an operating device 110 and a variety of sensors 62 to 67 detect information regarding the engine 14.

The operating device 110 is provided in the watercraft 100. The operating device 110 includes a throttle-shift operating device 111, a steering operating device 112, and a start switch 113. The throttle-shift operating device 111 is operable by an operator to regulate the rotational speed of the engine 14 in the marine propulsion device 1. The throttle-shift operating device 111 is operable by the operator to perform switching between a forward moving action and a rearward moving action by the marine propulsion device 1.

The throttle-shift operating device 111 includes a throttle lever 114. The throttle lever 114 is operable from a neutral position to a forward moving position and a rearward moving position. The throttle-shift operating device 111 outputs a throttle signal indicating the operating position of the throttle lever 114. The ECU 61 receives the throttle signal outputted from the throttle-shift operating device 111. The ECU 61 controls a shift actuator 68 in accordance with the operating position of the throttle lever 114 so as to drive the shift mechanism 25. The shift actuator 68 drives the clutch in the shift mechanism 25 so as to change meshing of the gears. Accordingly, the rotational direction of the propeller shaft 24 is switched between the direction corresponding to forward movement or the direction corresponding to rearward movement. The ECU 61 controls the rotational speed of the engine 14 in accordance with the operating position of the throttle lever 114.

The steering operating device 112 is operable by the operator to adjust the rudder angle of the marine propulsion device 1. The steering operating device 112 includes, for instance, a steering wheel. Alternatively, the steering operating device 112 may be another type of operating device such as a joystick. The steering operating device 112 is operable right and left from a neutral position. The steering operating device 112 outputs a steering signal indicating the operating position thereof to a controller (not shown in the drawings) provided in the watercraft 100. The controller provided in the watercraft 100 controls a steering actuator 120 in accordance with the operating position of the steering operating device 112 so as to control the rudder angle of the marine propulsion device 1. The steering actuator 120 is disposed in the watercraft 100. The steering actuator 120 includes, for instance, an electric motor. Alternatively, the steering actuator 120 may include an electric pump and a hydraulic cylinder.

The start switch 113 is operable by the operator to start and stop the engine 14. The start switch 113 is disposed in the vicinity of the steering operating device 112. For example, the start switch 113 is a key switch. When operated by the operator, the start switch 113 outputs an operating signal to start or stop the engine 14 to the ECU 61 of the marine propulsion device 1.

The crank angle sensor 62 detects the angle of rotation of the crankshaft 22. The crank angle sensor 62 includes a magnetic sensor, and as shown in FIG. 7, detects passage of a plurality of protrusions **22*a* of the crankshaft 22. It should be noted that in FIG. 7, reference sign 22*a* indicates only one of the plural protrusions 22*a*. The crankshaft 22 is provided with the plurality of protrusions 22*a* regularly aligned on the surface thereof. It should be noted that the crankshaft 22 is provided with a missing region 22*b* on the surface thereof. The protrusions 22*a* are not provided in the missing region 22*b* and the interval between a pair of adjacent protrusions 22*a* defining the missing region 22*b* is different from that between each other pair of adjacent protrusions 22*a***.

A magnetic field is strengthened when the protrusions **22*a* pass through a position opposed to the crank angle sensor 62. Thus, periodic spikes are indicated in the waveform of the detection signal. By contrast, when the missing region 22*b* passes through the position opposed to the crank angle sensor 62, such spikes are not indicated in the waveform of the detection signal and the signal strength of the detection signal is kept constant. Because of this, crank spike regions, in each of which the periodic spikes are indicated, and crank flat regions, in each of which the periodic spikes are not indicated and the signal strength is kept constant (i.e., the waveform is flat), alternately appear in the waveform of the detection signal of the crank angle sensor 62. As a result of detecting these regions, the speed of rotation and the angle of rotation of the crankshaft 22** are detected.

The throttle opening degree sensor 63 detects the opening degree of the throttle valve 48. The intake pressure sensor 64 detects the pressure inside the intake pipe 46. The exhaust pressure sensor 65 detects the pressure inside the exhaust pipe 50. The fuel flow rate sensor 66 detects the flow rate of the fuel to be supplied to the engine 14.

A tilt angle sensor 67 (exemplary tilt detector) detects the tilt angle of the marine propulsion device 1. The tilt angle sensor 67 detects information regarding the tilt angle of each cylinder 31 and outputs the detected information to the ECU 61. For example, an IMU (Inertial Measurement Unit) can be used as the tilt angle sensor 67. However, the tilt angle sensor 67 is not limited to the IMU, and a potentiometer or so forth may be used as the tilt angle sensor 67. The tilt angle sensor 67 can be disposed in or on the bracket 16. The tilt angle sensor 67 may detect the angle of rotation of the rotational shaft **16*a* of the bracket 16**.

The ECU 61 includes a storage 71, a CPU (Central Processing Unit) 72, and a timer 73. The storage 71 is a storage in which electronic data are writable therein and are readable therefrom. The storage 71 includes a memory such as a RAM (Random Access Memory) or a ROM (Read Only Memory) and an auxiliary storage device such as an HDD (Hard Disk Drive) or an SSD (Solid State Drive). The storage 71 stores control programs corresponding to predetermined operating states. The storage 71 stores a threshold of an angle θ (to be described), a threshold of a stopped time of the engine 14, an ignition standby time, and a threshold of the speed of rotation of the crankshaft 22. The timer 73 counts an elapsed time and outputs the elapsed time to the CPU 72.

When receiving the operating signal to start the engine 14 from the start switch 113, the ECU 61 executes a cranking control so as to start the engine 14.

The marine propulsion device 1 further includes a starter motor 69. The watercraft 100 further includes a battery 130. The starter motor 69 rotates the crankshaft 22 during the cranking control. When receiving the operating signal to start the engine 14, the ECU 61 outputs a drive command to the starter motor 69. The starter motor 69 is provided with electricity from the battery 130 and is driven to rotate the crankshaft 22. It should be noted that, when the marine propulsion device 1 is designed to include a power generator and a battery to store electric power generated by the power generator, the starter motor 69 may be provided with electricity from the battery within the marine propulsion device 1.

The ECU 61 controls the fuel injection device 47, the throttle valve 48, and the ignition device 49 in accordance with rotation of the crankshaft 22. When an initial explosion occurs due to activation of the ignition device 49, and then, the speed of rotation of the crankshaft 22 becomes greater than or equal to the predetermined threshold, the cranking control is completed. For example, the speed of rotation of the crankshaft 22 rotated by the starter motor 69 is about 250 rpm, and can be set to be about 500 rpm as the predetermined threshold thereof. The predetermined threshold has been stored in the storage 71.

In the present preferred embodiment, the cranking control includes a first cranking control and a second cranking control. In starting the engine 14, the ECU 61 executes either the first or second cranking control based on the value of detection by the tilt angle sensor 67 and the elapsed time inputted thereto from the timer 73.

Figure 8:
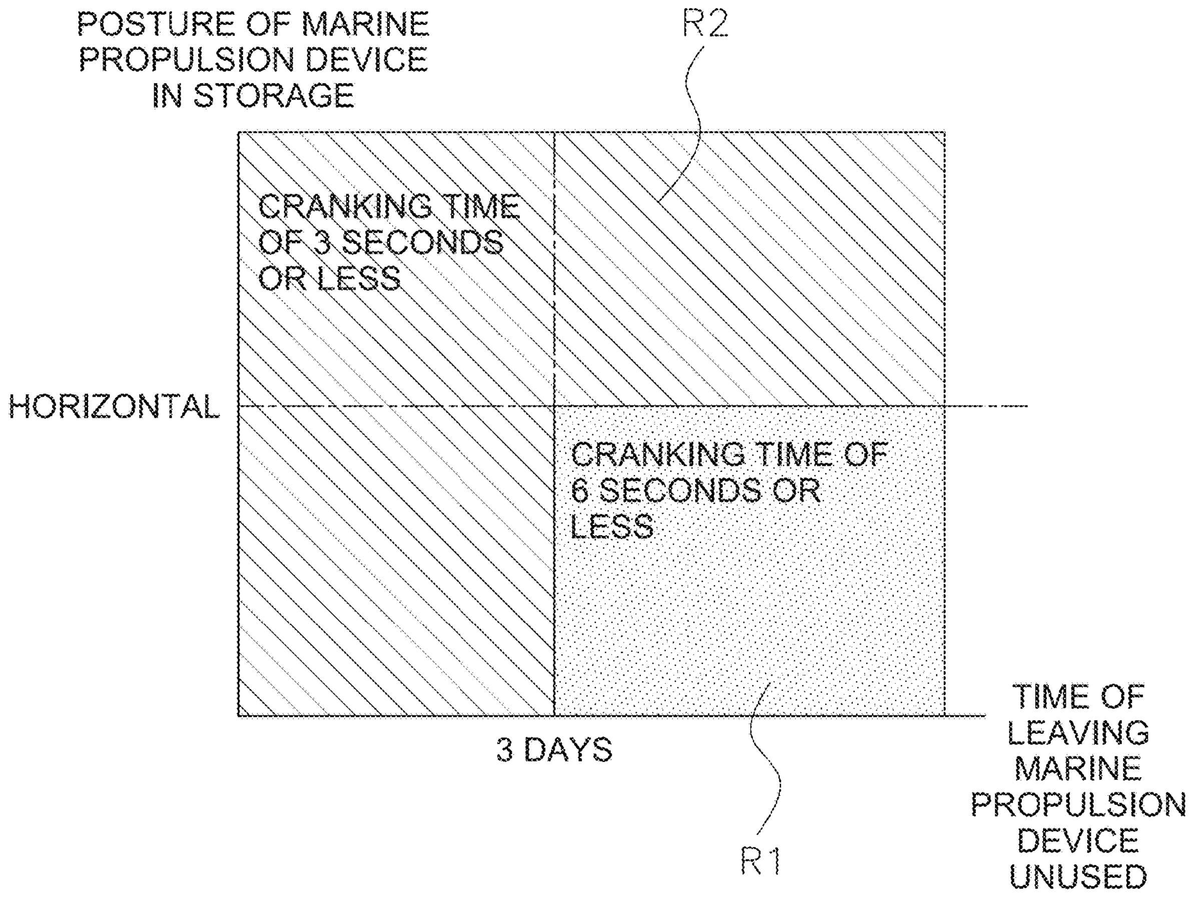
FIG. 8 is a chart showing conditions to be satisfied when first and second cranking controls are executed.

FIG. 8 is a chart showing conditions to be satisfied when the first and second cranking controls are executed. In FIG. 8, the horizontal axis indicates the time of leaving the marine propulsion device 1 unused, while the vertical axis indicates the posture of the marine propulsion device 1 during storage. The first cranking control is executed in a dotted region R1. On the other hand, the second cranking control is executed in a hatched region R2.

The first cranking control is executed when the marine propulsion device 1 is left unused for three days or more, and while each cylinder 31 is tilted such that the end 31*b* is lower than the end 31*a* (see the region R1). In the first cranking control, the ECU 61 causes the starter motor 69 to rotate the crankshaft 22. Then, after an elapse of the ignition standby time, the ECU 61 causes the ignition device 49 to ignite the fuel. As explained with reference to FIG. 5, when the marine propulsion device 1 is stored for a long period of time, and while each cylinder 31 is tilted such that the end 31*b* is lower than the end 31*a*, the oil W is accumulated in the combustion chamber 43. When the crankshaft 22 is rotated for the predetermined ignition standby time without causing the ignition device 49 to ignite the fuel, the piston 36 is driven in conjunction with the rotation of the crankshaft 22, and simultaneously, the exhaust valve 45 is opened and closed such that the oil W can be discharged from the combustion chamber 43. Because of this, white smoke is reduced or prevented from being generated in the initial explosion by executing the first cranking control. For example, the ignition standby time is set to complete the first cranking control within about six seconds. The ignition standby time is stored in the storage 71.

The ECU 61 determines whether or not each cylinder 31 is tilted such that the end 31*b* is lower than the end 31*a* based on the value of detection by the tilt angle sensor 67. For example, as shown in FIG. 6, the ECU 61 calculates the angle θ of the center axis O of each cylinder 31 with respect to a horizontal direction H based on the value of detection by the tilt angle sensor 67. For example, when each cylinder 31 is tilted from the horizontal state thereof such that the end 31*b* is moved downward with respect to the end 31*a*, the angle θ is set to have a positive value; whereas when each cylinder 31 is tilted from the horizontal state thereof such that the end 31*b* is moved upward with respect to the end 31*a*, the angle θ is set to have a negative value. A predetermined threshold has been preliminarily set for the positive value of the angle θ in consideration of errors and is stored in the storage 71. The ECU 61 determines that each cylinder 31 is tilted such that the end 31*b* is lower than the end 31*a* when the angle θ is calculated as having a value of greater than or equal to the predetermined threshold.

The ECU 61 determines whether or not the stopped time of the engine 14 (synonymous with the time of leaving the marine propulsion device 1 unused shown in FIG. 8) is three days or more based on the elapsed time detected by the timer 73. The value of three days is set as the threshold of the stopped time of the engine 14 and is stored in the storage 71. It should be noted that the threshold of the stopped time of the engine 14 may not be three days and may be arbitrarily changed depending on the shape of the engine 14.

On the other hand, the second cranking control (see the region R2) is executed except for when the marine propulsion device 1 is left unused for three days or more, and while each cylinder 31 is tilted such that the end 31*b* is lower than the end 31*a*. The second cranking control is a normal control. In the second cranking control, the ECU 61 causes the ignition device 49 to ignite the fuel in conjunction with starting the rotation of the crankshaft 22. The second cranking control is completed in about three seconds or less.

Thus, the first cranking control is set to be longer in cranking time than the second cranking control. The first cranking control is longer in rotational time of the crankshaft 22 than the second cranking control. Thus, the first cranking control is longer not only in actuation time of each piston 36 but also in opened time of each exhaust valve 45 than the second cranking control. Thus, because of the longer driving time of each piston 36 and the longer opened time of each exhaust valve 45, the oil W is discharged from the combustion chamber 43 to the exhaust pathway 30 in the first cranking control.

Figure 9:
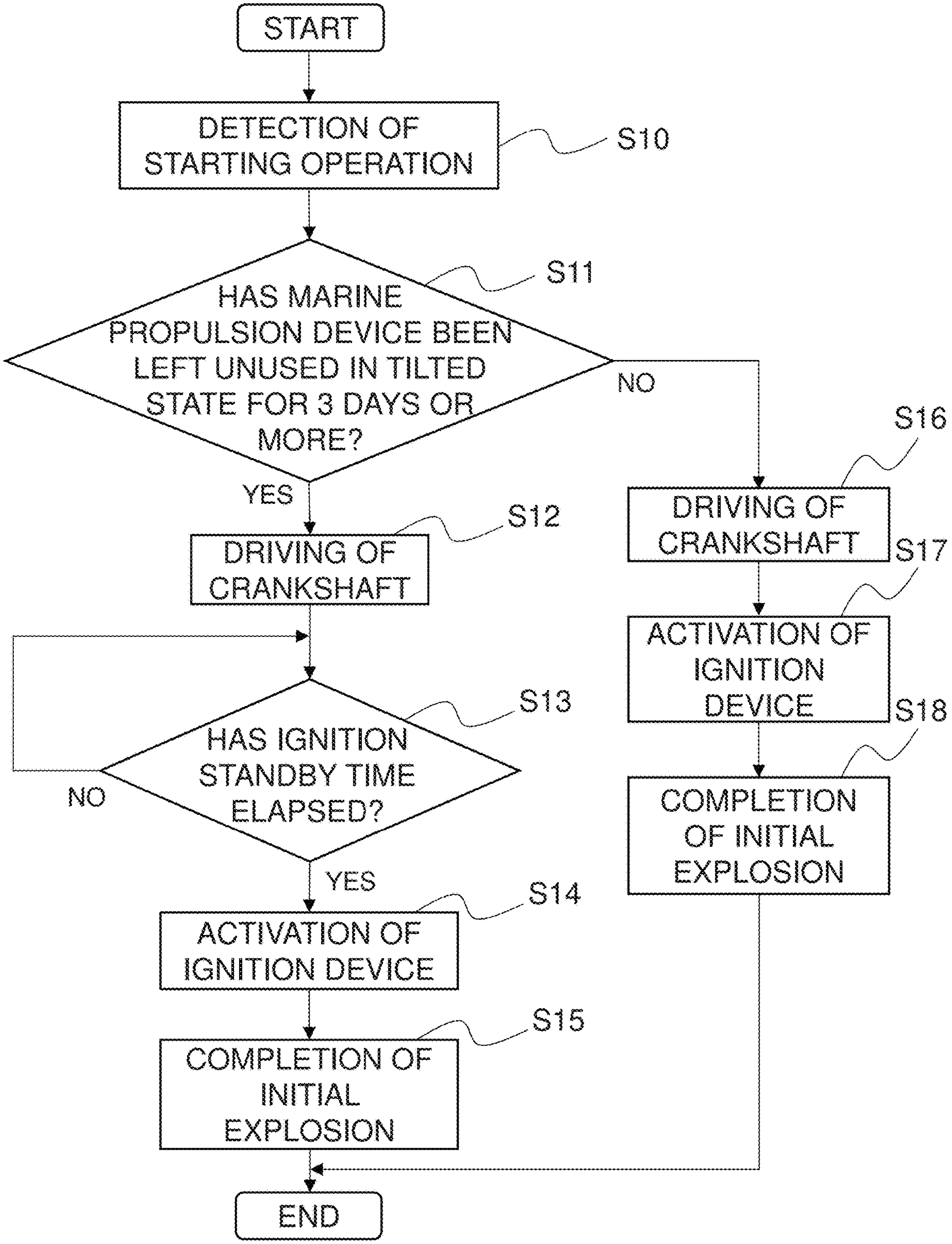
FIG. 9 is a flowchart showing a series of control actions to be performed by the marine propulsion device.

Next, explanation will be provided regarding a series of control actions to be performed by the marine propulsion device 1 in the present preferred embodiment. FIG. 9 is a flowchart showing the series of control actions to be performed by the marine propulsion device 1 in the present preferred embodiment.

When the operator operates the start switch 113 to start the engine 14, in step S10, the operating signal to start the engine 14 is inputted to the ECU 61 such that the ECU 61 detects the starting operation.

Next, in step S11, the ECU 61 determines whether or not the marine propulsion device 1 is left unused for three days or more, and while each cylinder 31 is tilted such that the end 31*b* is lower than the end 31*a*. The ECU 61 determines whether or not the stopped time of the engine 14 is three days or more based on the elapsed time inputted thereto from the timer 73. The ECU 61 calculates the angle θ based on the value of detection by the tilt angle sensor 67. When the angle θ is greater than or equal to the predetermined threshold, the ECU 61 determines that each cylinder 31 is tilted such that the end 31*b* is lower than the end 31*a*. The ECU 61 executes the first cranking control shown in steps S12 to S15 when it is determined that the marine propulsion device 1 is left unused for three days or more, and while each cylinder 31 is tilted such that the end 31*b* is lower than the end 31*a*. Step S11 is exemplified as a tilt detection step. Steps S12 to S15 are exemplified as a control step.

In step S12, the ECU 61 drives and causes the starter motor 69 to rotate the crankshaft 22. The piston 36 is also driven in conjunction with the rotation of the crankshaft 22 such that the exhaust valve 45 is also opened and closed.

Next, in step S13, the ECU 61 determines whether or not the ignition standby time has elapsed based on the information of elapsed time inputted thereto from the timer 73. The ECU 61 rotates the crankshaft 22 until the elapse of the ignition standby time. During the ignition standby time, the piston 36 is driven, and simultaneously, the exhaust valve 45 is also opened and closed. Thus, the oil W is discharged from the combustion chamber 43.

When the ignition standby time elapses in step S13, the control process proceeds to step S14.

In step S14, the ECU 61 controls the fuel injection device 47 and the throttle valve 48 and causes the ignition device 49 to ignite the fuel.

When the speed of rotation of the crankshaft 22 becomes greater than or equal to the predetermined threshold in step S15, the ECU 61 determines that the initial explosion has completed and finishes executing the first cranking control by stopping both driving of the starter motor 69 and ignition by the ignition device 49.

On the other hand, the ECU 61 executes the second cranking control shown in steps S16 to S18 when it is determined that the marine propulsion device 1 has not been left unused for three days or more, and while each cylinder 31 is tilted such that the end 31*b* is lower than the end 31*a* in step S11.

In step S16, the ECU 61 drives and causes the starter motor 69 to rotate the crankshaft 22. The piston 36 is also driven in conjunction with the rotation of the crankshaft 22 such that the exhaust valve 45 is also opened and closed.

In step S17, the ECU 61 controls the fuel injection device 47 and the throttle valve 48 and causes the ignition device 49 to ignite the fuel.

When the speed of rotation of the crankshaft 22 becomes greater than or equal to the predetermined threshold in step S18, the ECU 61 determines that the initial explosion has completed and finishes executing the second cranking control by stopping both driving of the starter motor 69 and ignition by the ignition device 49.

In the marine propulsion device 1, when it is determined that the marine propulsion device 1 has been stored for a long period of time, and while being tilted such that the oil W is likely to be accumulated in the combustion chamber 43, the cranking time is set to be longer than usual. By thus setting the cranking time to be longer than usual, the oil W accumulated in the combustion chamber 43 is discharged to the exhaust pathway 30 before combustion thereof. The ignition device 49 is caused to ignite the fuel after the oil W accumulated in the combustion chamber 43 is discharged to the exhaust pathway 30. Thus, white smoke is prevented or reduced.

Preferred embodiments of the present invention have been explained above. However, the present invention is not limited to the preferred embodiments described above, and a variety of changes can be made without departing from the gist of the present invention.

In a preferred embodiment described above, the start switch 113 is provided and the ECU 61 rotates the crankshaft 22 based on operating the start switch 113. However, the start switch 113 may not be provided; alternatively, a starter rope may be provided. The crankshaft 22 is configured to be driven by pulling the starter rope. In this case, the starting operation can be detected in step S10 by, for instance, causing the crank angle sensor 62 to detect the rotation of the crankshaft 22.

In a preferred embodiment described above, the threshold of the stopped time of the engine and that of the tilt angle are set independently from each other. However, the thresholds may be set in relation to each other. For example, the threshold of the stopped time of the engine may set to be smaller with an increase in the value of the tilt angle.

In a preferred embodiment described above, the ignition standby time is set constant. However, the ignition standby time may be set to be longer with an increase in the stopped time of the engine. Alternatively, the ignition standby time may be set to be longer with increase in the value of the tilt angle.

According to preferred embodiments of the present invention, it is possible to provide marine propulsion devices and methods of controlling marine propulsion devices in which white smoke generated during starting of an engine is reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion device comprising:

an engine including a cylinder, a piston inside the cylinder, and a rod connected to the piston;

a crankshaft to which the rod is connected;

a tilt detector to detect a tilt state of the cylinder such that a first side portion thereof located on an opposite side from the crankshaft is lower than a second side portion thereof located on a same side as the crankshaft; and a controller configured or programmed to execute a first cranking control of a prolonged cranking time based on the tilt state of the cylinder and a stopped time of the engine.

2. The marine propulsion device according to claim 1, wherein the controller is configured or programmed to execute the first cranking control when the stopped time of the engine is greater than or equal to a predetermined period of time and the tilt state of the cylinder has been detected.

3. The marine propulsion device according to claim 2, wherein the controller is configured or programmed to execute a second cranking control shorter in the cranking time than the first cranking control when the stopped time of the engine is less than the predetermined period of time or when the tilt state of the cylinder has not been detected.

4. The marine propulsion device according to claim 3, wherein the engine further includes an ignition to ignite fuel;

the controller is configured or programmed to cause the ignition to ignite the fuel after an elapse of a predetermined period of time from starting of driving the piston during the first cranking control; and the controller is configured or programmed to start the ignition to ignite the fuel simultaneously with the starting of driving the piston during the second cranking control.

5. The marine propulsion device according to claim 4, wherein the engine further includes an exhaust valve on the cylinder; and the controller is configured or programmed to execute the first cranking control by prolonging a period of time of opening the exhaust valve until an occurrence of an initial explosion that is longer during the first cranking control than during the second cranking control.

6. A method of controlling a marine propulsion device, the method comprising:

detecting a tilt state of a cylinder such that a first side portion thereof located on an opposite side from a crankshaft is lower than a second side portion thereof located on a same side as the crankshaft, the cylinder accommodating a piston therein, and the piston is connected to the crankshaft through a rod; and executing a cranking control of a prolonged cranking time based on the tilt state of the cylinder and a stopped time of an engine.

* * * * *